United States Patent
Tat et al.

(10) Patent No.: US 9,546,865 B1
(45) Date of Patent: Jan. 17, 2017

(54) SURFACE INSPECTION OF COMPOSITE STRUCTURES

(71) Applicant: The Boeing Company, Chicago, IL (US)

(72) Inventors: Hong H. Tat, Redmond, WA (US); Yuan-Jye Wu, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/829,612

(22) Filed: Aug. 18, 2015

(51) Int. Cl.
*G01B 11/30* (2006.01)
*G01B 11/06* (2006.01)

(52) U.S. Cl.
CPC ......... *G01B 11/303* (2013.01); *G01B 11/0608* (2013.01)

(58) Field of Classification Search
CPC ............ G01N 2291/2694; G01N 29/30; G01N 2291/0231; G01N 2021/8472; G01N 2291/044; G01N 2291/106; G01N 29/043; G01N 29/265; G01N 21/8806; G01N 2291/0289; G01N 23/00; G01N 25/72; G01N 29/04
See application file for complete search history.

(56) References Cited

U.S. PATENT DOCUMENTS

| | | | |
|---|---|---|---|
| 5,562,788 A | 10/1996 | Kitson et al. | |
| 7,601,978 B2 | 10/2009 | Sari-sarraf et al. | |
| 2003/0160970 A1* | 8/2003 | Basu | G01B 11/2518 356/601 |
| 2005/0117793 A1 | 6/2005 | Engelbart et al. | |
| 2011/0134225 A1* | 6/2011 | Saint-Pierre | G01B 11/03 348/47 |
| 2013/0070257 A1* | 3/2013 | Wong | G01B 11/25 356/601 |
| 2015/0178412 A1* | 6/2015 | Grau | G06F 17/50 703/1 |

* cited by examiner

*Primary Examiner* — Michael P Stafira
(74) *Attorney, Agent, or Firm* — Kwan & Olynick LLP

(57) ABSTRACT

Provided are methods and inspection systems for evaluating height deviations on surfaces of composite structures. The method is based on obtaining multiple linear height profiles of a surface and generating a three-dimensional representation of that surface. This representation is then analyzed to determine various height deviations, such as wrinkles. The three-dimensional surface representation is generated based on position of each linear height profile on the surface. The analysis may be performed along any direction, which may be different than the inspection directions of to the linear height profiles. As such, height information from multiple height profiles is analyzed at the same time. This approach increases the quality of inspection and ensures that different types of height variations can be identified, which may be missed with individual analysis of each linear height profile. Furthermore, this approach allows using high precision linear height detectors, such as laser profilers.

21 Claims, 13 Drawing Sheets

SURFACE INSPECTION OF COMPOSITE STRUCTURES

BACKGROUND

Composite materials, such as fiber-reinforced materials, are being rapidly adopted for many new applications because of their light weight and exceptional strength. Some application examples include aerospace components (e.g., aircraft tail components, wing structures, fuselage skins, propellers, and the like), boats (e.g., hulls), bicycles (e.g., frames, sprockets), automotive (e.g., body panels, structural components, gas tanks), and the like. Various inconsistencies, in particular, height deviations on surfaces of formed composite structures, such as large wrinkles, can be undesirable when out of tolerance size. Wrinkles may occur during the fabrication of a composite part. Accurate sizing of inconsistencies (like wrinkle) on the surface of a composite part is essential to determining if it is outside of tolerances. This approach can also help to understand various processing conditions where inconsistencies such as wrinkles may form. At the same time, identification of wrinkles and other like inconsistencies may be more difficult than desired due to the nature of the surface (e.g., color and other surface conditions) of composite materials and the nature of the wrinkles (e.g., orientation, height deviations). Manual inspection processes have been primarily relied on for detecting wrinkles.

SUMMARY

Provided are methods and inspection systems for evaluating height deviations on surfaces of composite structures, such as detecting wrinkles and other examples of height deviation inconsistencies on these surfaces. The method is based on obtaining multiple linear height profiles of the same surface and generating a three-dimensional representation of that surface. The surface representation is generated based on the position of each linear height profile on the surface. For example, a height value for each inspected location on the surface is selected from the linear height profiles and combined into the same data array (e.g., two-dimensional array representing the surface). This representation is then analyzed to determine various height deviations. The analysis may be performed along any direction. Some analyzing directions may be different than the inspection directions of the linear height profiles. Other analyzing techniques (e.g., area analysis) may be used as well. Overall, height information from different height profiles is analyzed at the same time. This approach increases the quality of inspection and ensures that different types of height variations can be identified, which may be otherwise missed with individual analysis of each linear height profile. Furthermore, this approach allows using high precision linear height detectors, such as laser profilers.

In some embodiments, a method of evaluating height deviations on a surface of a composite structure involves obtaining a first linear height profile of the surface of the composite structure and obtaining a second linear height profile of the surface. The first linear height profile extends along the field of measurement of a detector at a first position relative to the composite structure. The second height profile extends along the field of measurement at a second position relative to the composite structure. The second position is different from the first position. The method may involve generating a three-dimensional surface representation of the surface of the composite structure based on the first linear height profile, the second linear height profile, the first position of the detector, and the second position of the detector. The detector may be a laser profiler. Furthermore, the method may involve analyzing the three-dimensional surface representation to determine the height deviations on the surface of the composite structure.

In some embodiments, the analyzing of the three-dimensional surface representation is performed along a first analyzing direction different than a first inspection direction of at least one of the field of measurement of the detector in the first position. The first analyzing direction may be also different than a second inspection direction of the field of measurement of the detector in the second position. For example, the first analyzing direction may be perpendicular to the first inspection direction. In some embodiments, analyzing the three-dimensional surface representation is also performed along a second analyzing direction parallel to the first inspection direction.

In some embodiments, analyzing the three-dimensional surface representation comprises generating an outlier representation of all positions on the surface of the composite structure that have height deviations outside of a tolerance for one or more parameters. Examples of the height deviations may be wrinkles and warping. Wrinkles may be considered local height deviations and may be analyzed based on portions of the overall surface. Warping may be considered as a global height deviation inconsistencies and the entire surface of the composite structure may be analyzed to determine warping.

In some embodiments, the method also involves obtaining the first position of the detector relative to the composite structure and obtaining the second position of the detector relative to the composite structure. The first position and the second position may be obtained from an encoder. For example, a user may move the detector from the first position to the second position after obtaining the first linear height profile of the surface of the composite structure. The encoder may send a signal to indicate this movement.

In some embodiments, the field of measurement of the detector in the first position is parallel to the field of measurement of the detector in the second position. In these embodiments, the detector may be moved from the first position into the second position along the direction perpendicular to the field of measurement of the detector in the first position. The field of measurement of the detector in the first position is offset from the field of measurement of the detector in the second position by at least one of an offset distance or an offset angle. The offset distance or the offset angle may be based on tolerance for one or more parameters for the height deviations and/or values of the height deviations in the first linear height profile.

In some embodiments, the method may also involve obtaining a third linear height profile of the surface of the composite structure. The third linear height profile extends along the field of measurement of the detector in a third position relative to the composite structure. The offset between the first position and the second position is different from the offset between the second position and the third position. In some embodiments, the first position of the detector is a two dimensional coordinate of a point in the field of measurement of the detector relative to a reference point of the composite structure. Furthermore, the position of the detector may be identified with polar coordinates or other types of coordinate systems.

In some embodiments, generating the three-dimensional surface representation may involve arranging height values from the first linear height profile and the second linear height profile in a two-dimensional matrix. Each of the height values in the two-dimensional matrix corresponds to a different position on the surface of the composite structure. When the first linear height profile overlaps with the second linear height profile at an overlap on the surface of the composite structure, each height value in the overlap may be an average of the height values of the first linear height profile and the second linear height profile. Alternatively, the highest values (representing the worst case scenario) are selected from the first linear height profile and the second linear height profile.

In some embodiments, the method also involves changing a position of the detector relative to the composite structure from the first position to the second position. This changing may be performed manually. Alternatively, the detector may be moved relative to the composite structure using a motion device.

In some embodiments, the second position depends on the first linear height profile. For example, if there are substantial height deviations in the first linear height profile, then the second position may be closer to the first position than when the first linear height profile has fewer deviations.

In some embodiments, the method also involves obtaining an additional linear height profile of an additional surface of the composite structure. The first additional linear height profile extends along the field of measurement of the detector positioned at the first position. For example, the additional surface may be a surface of a new ply positioned over the original surface.

Also provided is an inspection system for evaluating height deviations on a surface of a composite structure. The inspection system may include a detector configured to obtain a first linear height profile and a second linear height profile of the surface of the composite structure. The first linear height profile may extend along a field of measurement of the detector at a first position relative to the composite structure. The second height profile may extend along the field of measurement of the detector at a second position relative to the composite structure. Furthermore, the second position may be different from the first position.

The inspection system may also include an encoder configured to determine the first position and the second position of the detector. Furthermore, the inspection system may include a system controller configured to generate a three-dimensional surface representation of the surface of the composite structure based on the first linear height profile, the second linear height profile, the first position of the detector, and the second position of the detector. The system controller may be also configured to analyze the three-dimensional surface representation to determine the height deviations on the surface of the composite structure. In some embodiments, the system controller comprises a computer program for generating the three-dimensional surface representation of the surface of the composite structure based on the first linear height profile, the second linear height profile, the first position of the detector, and the second position of the detector and for analyzing the three-dimensional surface representation to determine the height deviations on the surface of the composite structure.

These and other embodiments are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

New types of composite materials and new applications of these composite materials drive importance of inspection.

Figure 1A:
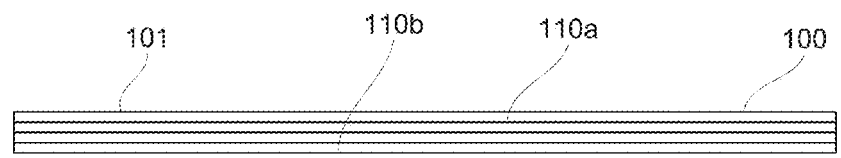
FIG. 1A is a schematic representation of one example of a composite structure including multiple plies.

Wrinkles can form in a composite structure during the layup operation or during subsequent shaping and forming processes. A brief description of composite structures and wrinkles may be helpful for better understanding of various aspects of this disclosure. Specifically, FIG. 1A is a schematic illustration of one example of composite structure 100 including multiple plies, in particular top ply 100a and bottom ply 110b. Each ply may consist of carbon-fibers combined with one or more resin matrices, such as polyethersulfone (PES), polyphenylsulfone (PPS), polyetheretherketone (PEEK), polyetherketoneketone (PEKK), and polyetherimide (PEI).

Many composite structures, such as skin panels, may have complex shapes also known as complex contours (e.g., various curvatures in their design). Flat composite laminates may be bent to form complex shapes. A process may start with creating a stack of individual plies. The number of plies in the stack controls the final thickness. Another process parameter is the ply orientation, which may be determined by engineering requirements for the structural performance of the composite structure. At this step, the composite structure, which may be also referred to as a layup prior to consolidating of the composite structure, is still flat as, for example, illustrated in FIG. 1A.

Figure 1B:
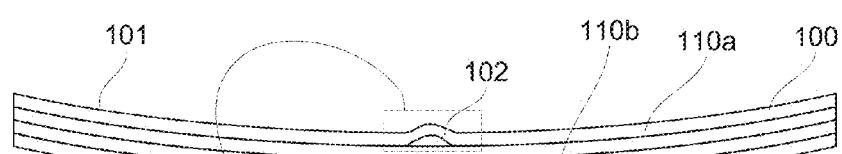
FIG. 1B is a schematic representation of the composite structure shown in FIG. 1A after shaping (or bending) the composite structure.
Figure 1C:
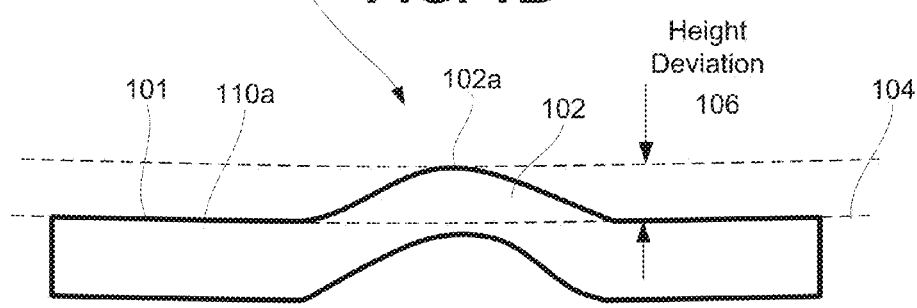
FIG. 1C is a schematic expanded view of a portion of the composite structure shown in FIG. 1B illustrating a winkle formed in the top ply of the composite structure after shaping (or bending).

Specifically, FIG. 1A is a schematic illustration of composite structure 100 including multiple plies 110a-100b. Individual plies 110a-110b are typically flat sheets. To create the complex shape, the flat layup is formed into that shape. Examples of forming processes include pressing the flat layup into a die or bending the layup around a mold. FIG. 1B illustrates same composite structure 100 after forming. Wrinkles may occur in composite structure 100 during this forming stage. Specifically, FIG. 1B and FIG. 1C illustrate wrinkle 102 formed in top ply 110a. After forming, composite structure 100 is cured. Wrinkles, which may be present prior to cure, may be also present during and after cure.

FIG. 1C is a schematic expanded view of a portion of top ply 110a showing wrinkle 102. For purposes of this disclosure, wrinkle 102 is an example of height deviation 106, which is defined as any protrusion beyond main surface portion 104 or, more specifically, the distance between highest point 102a of a protruding structure (e.g., wrinkle 102) to main surface portion 104. Main surface portion 104 represents the majority of surface 101 of composite structure 100. In this example, surface 101 is formed by top ply 110a and it has wrinkle 102.

Figure 1D:
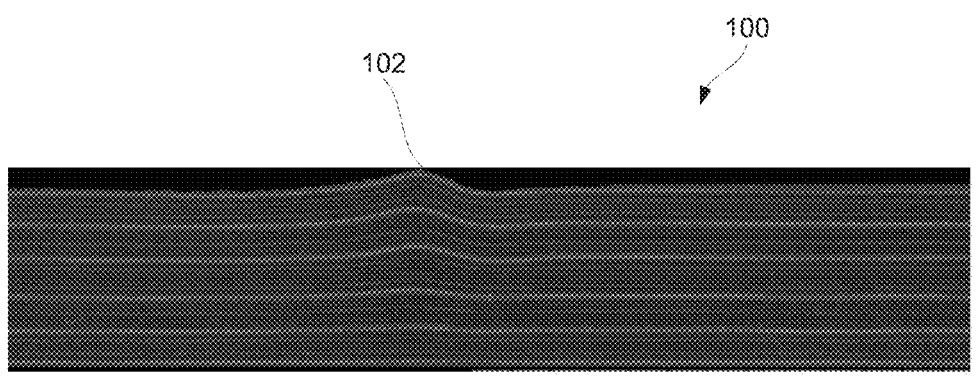
FIG. 1D is a photograph of a cross-section of an actual composite structure illustrating a wrinkle.

FIG. 1D is a photo of a cross-section of actual composite structure 100 illustrating wrinkle 102. Wrinkle 102 appears to propagate through multiple plies of this composite structure 100. If wrinkle 102 is formed during the layup process, it may be useful to inspect the layup after positioning each new ply to determine if new wrinkles start forming. Furthermore, the layup may be inspected for wrinkles after changing its shape and/or after curing the layup.

Provided methods and inspection systems may be used for evaluating height deviations on surfaces of composite structures in very precise yet efficient manner. The precision of these methods and systems comes from linear height detectors, such as laser profilers, used for surface scanning. While being very precise, these detectors only provide linear height profiles rather than height profiles of areas. In other words, a linear height detector inspects/scans only a line (or a very narrow area that can be viewed as a line) on the surface of a compost ire structure. This output may be referred to as a linear height profile and may be presented as a plot of height values along the inspection line.

This type of output of linear height detectors may have difficulty detecting some wrinkles. For example, a wrinkle may extend along the inspection line. In this case, the linear height profile may not show any height deviations along the line. To address this issue, the proposed methods are based on obtaining multiple linear height profiles of the same surface and generating a three-dimensional representation of that surface rather than analyzing each linear height profile individually.

Each linear height profile corresponds to a different position of the detector. In other words, the detector may have different positions when capturing different linear height profiles. These positions may be offset from each other by an offset distance and/or offset angle. The height data from these linear height profiles is aggregated into the three-dimensional surface representation. The representation may be a two-dimensional array (matrix) of height values, in which each height value corresponds to a different point on the surface of the composite structure. Various graphical representations may be used as well.

This three-dimensional surface representation is then analyzed to determine various height deviations, such as wrinkles. The analysis may be performed along any direction, which may be different than the inspection directions of the detector corresponding to linear height profiles. In some embodiments, the analysis may involve comparison of the scanned data and a design surface height, e.g., the height profile obtained from the CAD model for the surface. This approach may be used when the surface includes designed height deviations. Even though some wrinkles may extent along the inspection directions, these wrinkles will be detectable when analyzing the three-dimensional surface representation rather than individual linear profiles. This approach increases the quality of inspection and ensures that different types of height variations can be identified, which may be missed with individual analysis of each linear height profile.

Overall, the proposed methods and systems may utilize high precision detectors (e.g., laser profilers) in conjunction with positional encoders to identify positions of a detector each time the detector captures a new linear height profile. The linear height profiles are aggregated into a three-dimensional surface representation (e.g., a height map), which also takes into account detector's positions for each linear height profile. The height data may be displayed as an image corresponding to the surface (e.g., different height ranges shown with different colors/grayscales). Furthermore, the three-dimensional surface representation may be analyzed in any direction to allow for wrinkle sizing. As a result, there is less subjectivity in identification and measurement of wrinkles. Furthermore, complete surface representations (based on height values and their positions) of each surface can be obtained and analyzed for various factors. The method also has reduced time for data capture in comparison with conventional techniques. Finally, the methods have ability to capture more complex wrinkle parameters (in addition to dimensions of length and depth).

Figure 2A:
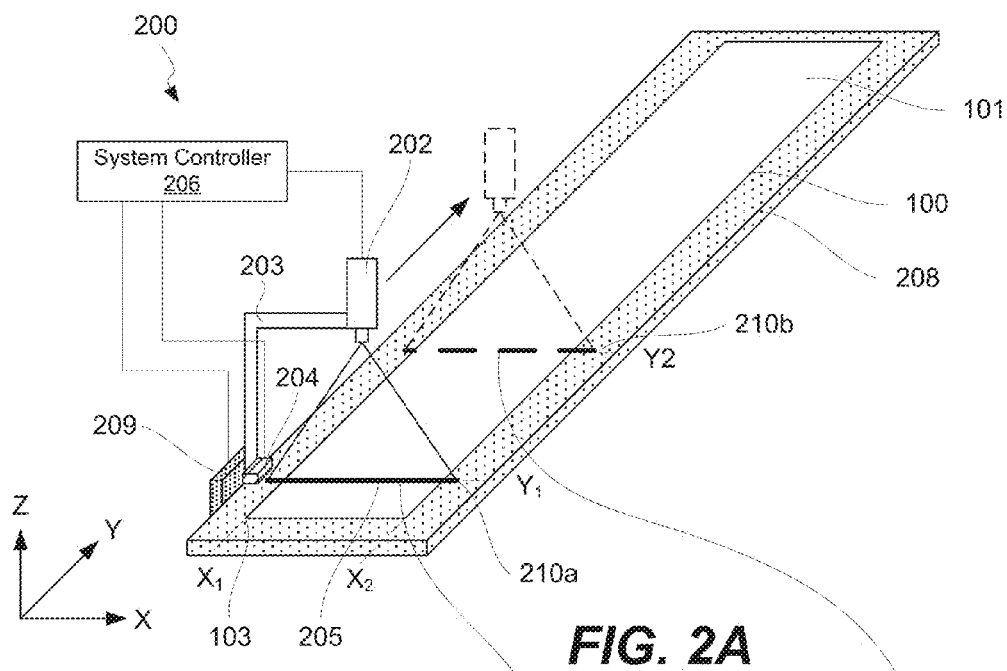
FIG. 2A is a schematic representation of a system for evaluating height deviations on a surface of a composite structure, in accordance with some embodiments.

Examples of Inspection Systems for Evaluating Height Deviations on Surfaces of Composite Structures FIG. 2A is a schematic representation of inspection system 200 for evaluating height deviations on surface 101 of composite structure 100, in accordance with some embodiments. While FIG. 2A illustrates composite structure 100 for reference, one having ordinary skills in the art would understand that composite structure 100 is not a part of inspection system 200. Inspection system 200 may include detector 202, encoder 204, and system controller 206. In some example, inspection system may also include detector support 203, composite structure support 208 and motion device 209. Alternatively, detector 202 may be moved manually, in which case inspection system 200 does not include any motion devices.

Figure 2B:
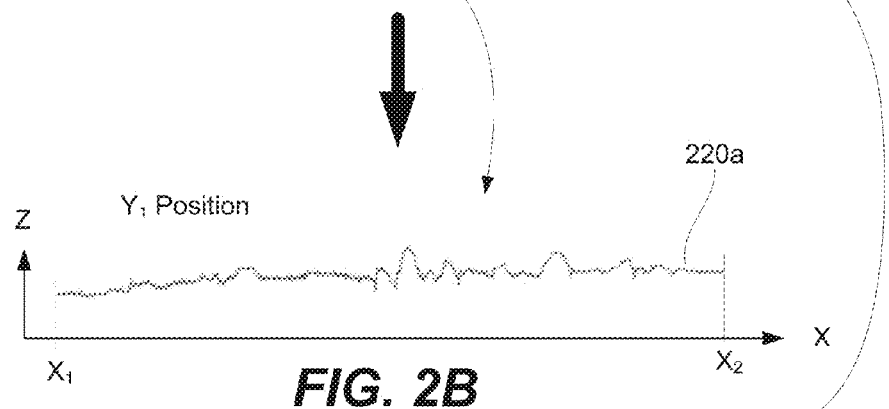
FIGS. 2B and 2C are schematic representations of two examples of linear height profiles.
Figure 2C:
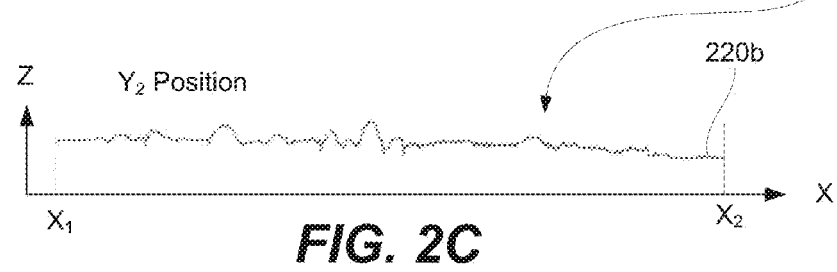

Detector 202 may be a laser profiler and may be used and configured to obtain linear height profiles 220. Examples of two such linear height profiles 220a and 220b are shown in FIGS. 2B and 2C. In some embodiments, linear height profiles 220 may be plots (or an array) of height values as a function of the position along field of measurement 205 of detector 202. Field of measurement 205 may be a line extending in an inspection direction as further described below with reference to FIG. 5. In the example presented in FIG. 2A, field of measurement 205 extends over the entire surface 101 of composite structure 100 along the X axis. However, as further described below with reference to FIG. 7A, field of measurement 205 may extend only over a portion of surface 101.

Detector 202 may be movable with respect to composite structure 208 and, as a result, able to capture linear height profiles 220 at different locations on surface 101 of composite structure 100. In FIG. 2A, detector 202 is shown in first position 210a, which may correspond to $Y_1$ on the Y axis. First linear height profile 220a shown in FIG. 2B correspond to first position 210a of detector 202. In other words, first linear height profile 220a may be an output of detector 202 while detector 202 is in first position 210a.

FIG. 2A also illustrates a dashed profile of detector 202 in second position 210b, which is different from first position 210a. For example, detector 202 may be moved from first position 210a to second position 210b along the Y axis. In this example, second position 210b may correspond to $Y_2$ on the Y axis, and second linear height profile 220b shown in FIG. 2C correspond to second position 210b.

Detector 202 may be moved manually between different positions. Alternatively, system 200 may include motion device 209 for moving detector 202 with respect to composite structure 208. Some examples of motion device 209 include a step motor, a linear table (e.g., Y-table), an X-Y table, a rotational device, or some other suitable devices. Motion device 209 may be positioned between composite structure 100 and detector 202 or, more specifically, at the interface of composite structure support 208 and detector support 203 as, for example, shown in FIG. 2A. In some embodiments, motion device 209 is controlled by system controller 206 to move detector 202 with respect to composite structure 208 into different positions. As further described below, a new position for detector 202 may be selected based on the current position and some offset. In some embodiments, a linear height profile is analyzed to determine the new position as further described below.

It should be noted that when detector 202 moves relative to composite structure 100, detector 202 may remain stationary while composite structure 100 may move in space. Alternatively, composite structure 100 may be stationary in space while detector 202 may move. In some embodiments, both detector 202 and composite structure 100 move relative to each other and to some other stationary reference in space. For example, detector 202 may move along one axis, while composite structure 100 may move along another axis. Furthermore, when detector 202 moves relative to composite structure 100, detector's height relative to surface 101 may remain the same. In other words, detector 202 may move within the plane parallel to surface 101.

Overall, first linear height profile 220a may represent height values of surface 101 along the X axis at first position 210a identified as $Y_1$. Second linear height profile 220a may represent height values of surface 101 along the X axis at second position 210b identified as $Y_2$. Second position 210b is different from first position 210a. Detector 202 may also inspect surface 101 at other positions as further described below with reference to FIG. 4.

Encoder 204 is used and configured to determine first position 210a and second position 210b and provide reference for linear height profiles 220a and 220b at these locations. For example, as detector 202 obtains first linear height profile 220a and transmits this profile or data corresponding to this profile to system controller 206, encoder 204 determines that detector 202 is in first position 210a. Furthermore, encoder 204 sends information about first position 210a (e.g., coordinate $Y_1$) to system controller 206.

Likewise, as detector 202 obtains second linear height profile 220b and transmits this profile or data corresponding to this profile to system controller 206, encoder 204 determines that detector 202 is in second position 210b while second linear height profile 220b is being obtained. Encoder 204 may also send information about second position 210b (e.g., coordinate $Y_2$) to system controller 206. This set of operations may be repeated for each new position and linear height profile corresponding to this position. The order of obtaining linear height profiles 220 and determining positions 210 or detector 202 may differ.

While FIG. 2A illustrates inspection system 200 having only one detector 202 and one encoder 204, in general inspection system may have any number of detectors and encoders. For example, multiple detectors 202 may be used to simultaneously scan different portions of surface 101 of composite structure 100. Data from all detectors may be aggregated into the same three-dimensional surface representation 303, which is described below with reference to FIGS. 3A-3C.

Inspection system 200 also includes system controller 206 configured to generate three-dimensional surface representation 303 of surface 101 of composite structure 100. As further, described below with reference to FIGS. 3A-3C, three-dimensional surface representation 303 may be arranged in a two-dimensional matrix, visual representation (e.g., a grayscale or colored image where the color depends on the height value at each location), and the like. System controller 206 generates three-dimensional surface representation 303 based on multiple linear height profiles 220 and corresponding positions 210 of detector 202 corresponding to these profiles 220. For example, system controller 206 may generate three-dimensional surface representation 303 based on first linear height profile 220a, second linear height profile 220b, first position 210a of detector 202, and second position 210b of detector 202. System controller 206 may be also configured to analyze three-dimensional surface representation 303 to determine height deviations 106 on surface 101 of composite structure 100 as further described below with reference to FIG. 4.

Figure 3A:
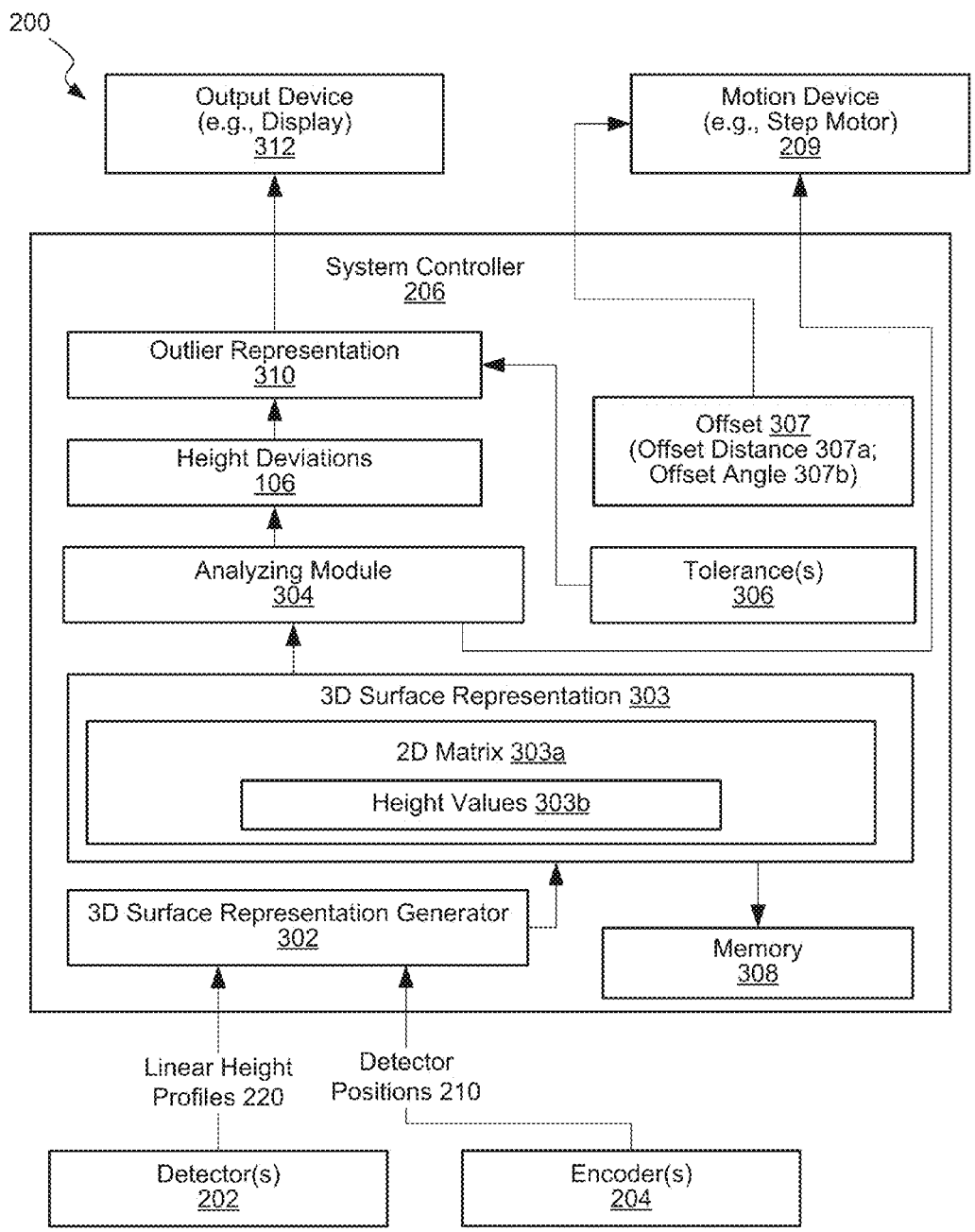
FIG. 3A is a schematic representation of a system controller of the system for evaluating height deviations shown in FIG. 2A, in accordance with some embodiments.
Figure 3B:
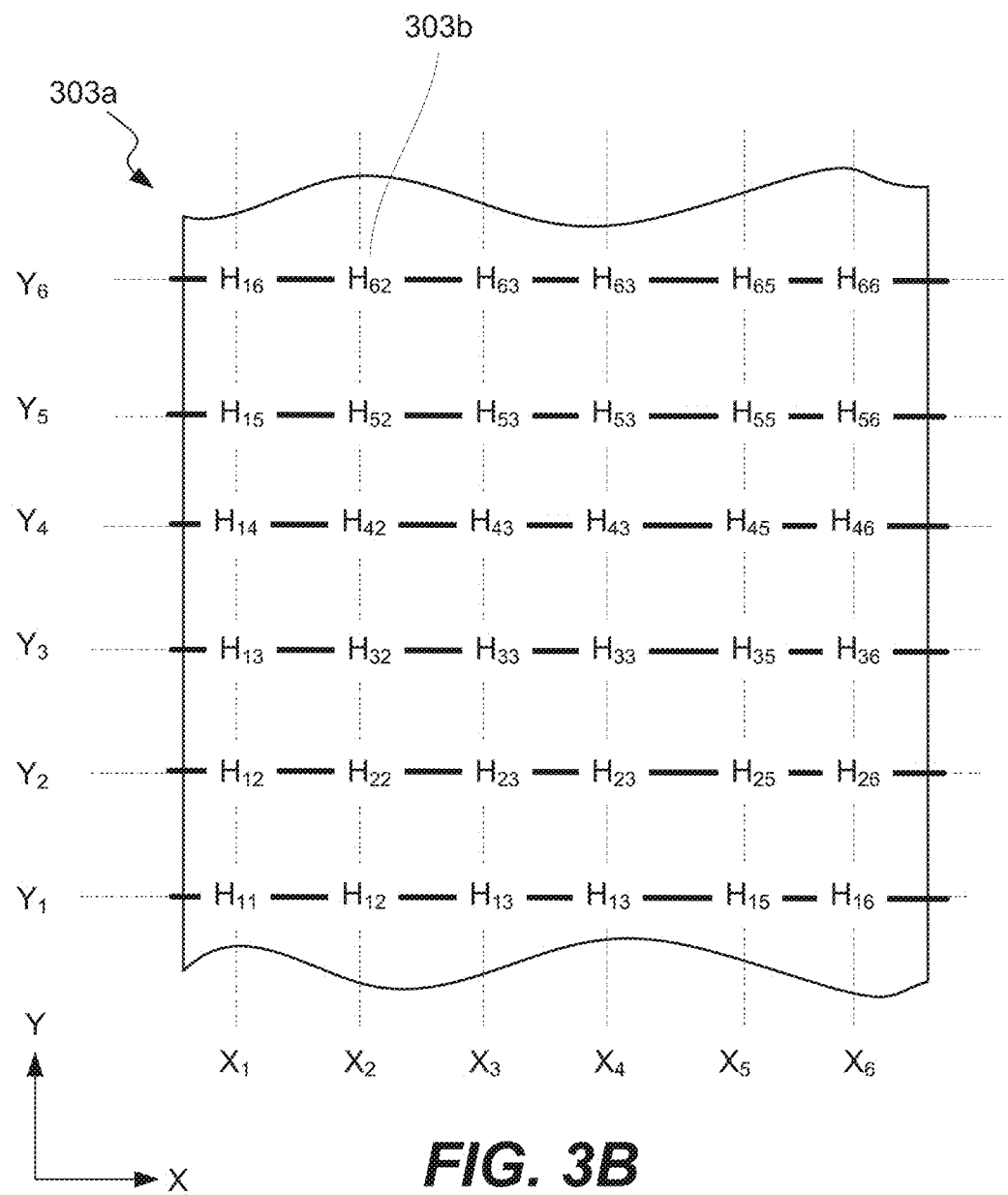
FIG. 3B is a schematic representation of one example of a three-dimensional surface representation.

FIG. 3A is a schematic illustration of various modules of system controller 206 and their interactions within system controller 206 and other components of inspection system 200, in accordance with some embodiments. Specifically, system controller 206 may include three-dimensional surface representation generator 302 used for generating three-dimensional surface representation 303. For example, three-dimensional surface representation generator 302 may compile information from linear height profiles and arrange height data from these profiles based on relative positions of detector 202 where each profile was obtained. In some aspects, three-dimensional surface representation generator 302 may be data aggregator and/or data sorter. One having ordinary skills in the art would understand algorithms used for three-dimensional surface representation generator 302.

In some embodiments, three-dimensional surface representation 303 is arranged in two-dimensional (2D) matrix 303a containing height values 303b for each position on surface 101 of composite structure 100 that has a corresponding linear height profile 220. One example of two-dimensional matrix 303a is presented in FIG. 3B. Each row in this two-dimensional matrix 303a represents a different linear height profile at a different location ($Y_1$, $Y_2$, and so on). Each column in this two-dimensional matrix 303a represents a different location in each linear height profile ($X_1$, $X_2$, and so on). Height values are identified as $H_{11}$, $H_{12}$, and so on. As such, all height value in the same row are obtained from the same linear height profile, e.g., $H_{11}$, $H_{12}$, $H_{13}$, $H_{13}$, $H_{14}$, $H_{15}$, and $H_{16}$ are obtained from one profile, while $H_{21}$, $H_{22}$, $H_{23}$, $H_{23}$, $H_{24}$, $H_{25}$, and $H_{26}$ are obtained from a different profile. However, values $H_{11}$, $H_{21}$, $H_{31}$ and so on corresponds to the same X position on different profiles. This type of data arrangement allows analyzing the height values in any directions, groups, or other methods. As such, wrinkles and other such inconsistencies can be more easily identified than for example when each linear height profile is analyzed individually.

Figure 3C:
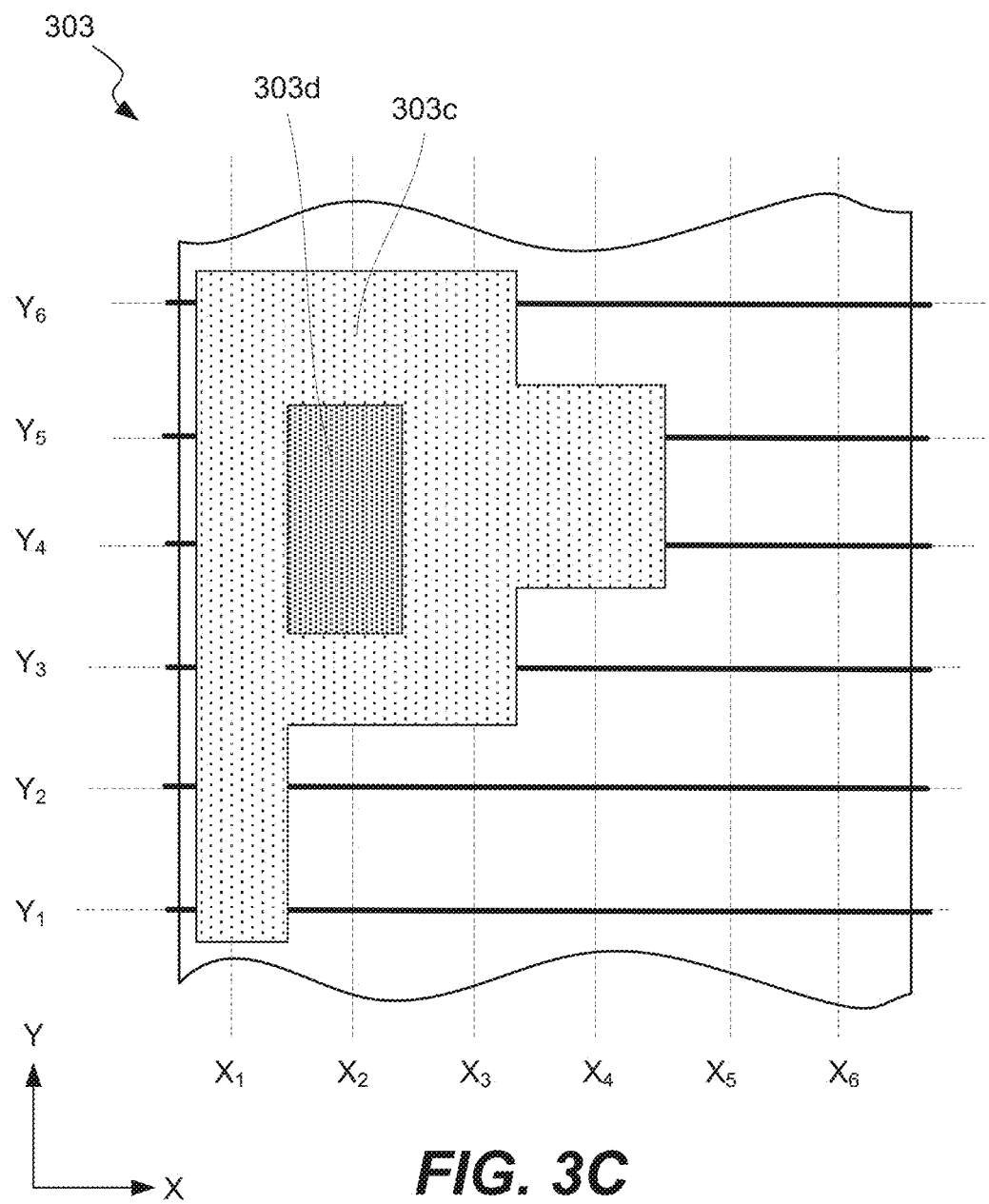
FIG. 3C is a schematic representation of another example of a three-dimensional surface representation, in accordance with some embodiments.

FIG. 3C illustrates another example of three-dimensional surface representation 303, which may be referred to as a visual representation. In this example, different height ranges are assigned different colors or different gray-scales. For example, height values corresponding to first area 303c and second area 303d may be in different ranges than the rest of height values for this surface. As such, first area 303c and second area 303d have different colors than the rest of three-dimensional surface representation 303. Furthermore, first area 303c and second area 303d are shown to have different colors because height values in these areas may fall within different ranges.

Overall, detector 202 obtains linear height profiles 220 at different positions of detector 202 for relative to the composite structure. These relative positions may be obtained by encoder 204. Linear height profiles 220 and positions are sent to system controller 206 which uses this data to generate three-dimensional surface representation 303 as described above. For example, system controller 206 may extract height values for different points on the surface of the composite. These height values may be used in a direct analysis (e.g., comparing to a model height value for each point and some tolerances). System controller 206 may include a computer program for generating the three-dimensional surface representation of the surface of the composite structure based on the first linear height profile, the second linear height profile, the first position of the detector, and the second position of the detector and for analyzing the three-dimensional surface representation to determine the height deviations on the surface of the composite structure. As such, three-dimensional surface representation generator 302 and/or analyzing module 304 may be implemented in software. The software of system controller 206 may be stored in memory 308. Overall, system controller 206 may be a specially configured computer system (as further described below with reference to FIG. 10) designed to process data received from detector 202 and/or encoder 204 and generate three-dimensional surface representation 303.

Returning to FIG. 3A, system controller 206 may also include memory 308 for storing three-dimensional surface representation 303 and, in some embodiments, other data. For example, memory 308 may also store data received from one or more detectors 202 (e.g., linear height profiles) and from one or more encoders 204 (e.g., detector positions at the time of capturing linear height profiles). Memory 308 may also store various data points used for analyzing three-dimensional surface representation 303. For example, memory 308 may store tolerance 306 for one or more parameters, such as length tolerance and depth tolerance. Memory 308 may also store offset 307 and other types of data.

Another component of system controller 206 is analyzing module 304. Analyzing module 304 may be used and configured to analyze three-dimensional surface representation 303 to determine height deviations 106 on surface 101 of composite structure 100 as further described below with reference to FIG. 4. In some embodiments, analyzing module 304 may identify outliers, which may be height deviations 106 that are outside of defined tolerances 306 for one or more parameters (e.g., length, depth, maximum angle from the height profile). Analyzing module 304 may construct outlier representation 310, which may be a visual representation (similar to FIG. 3C showing positions of the outliers), data representation (e.g., showing coordinates of the outliers), and the like. In some embodiments, system controller 206 may send outlier representation 310 to output device 312, such as a display, printer, or another computer system.

In some embodiments, system controller 206 may send instructions to motion device 209 to change position of detector 202 relative to composite structure 100. These instructions may be generated based on offset 307 as further described below with reference to FIGS. 8 and 9. In some embodiments, these instructions may be generated by analyzing module 304 based on analysis results of three-dimensional surface representation 303. For example, if significant height deviations 106 were identified in certain areas of three-dimensional surface representation 303, then motion device 209 may be instructed to position detector 202 around these areas for additional inspection.

Figure 4:
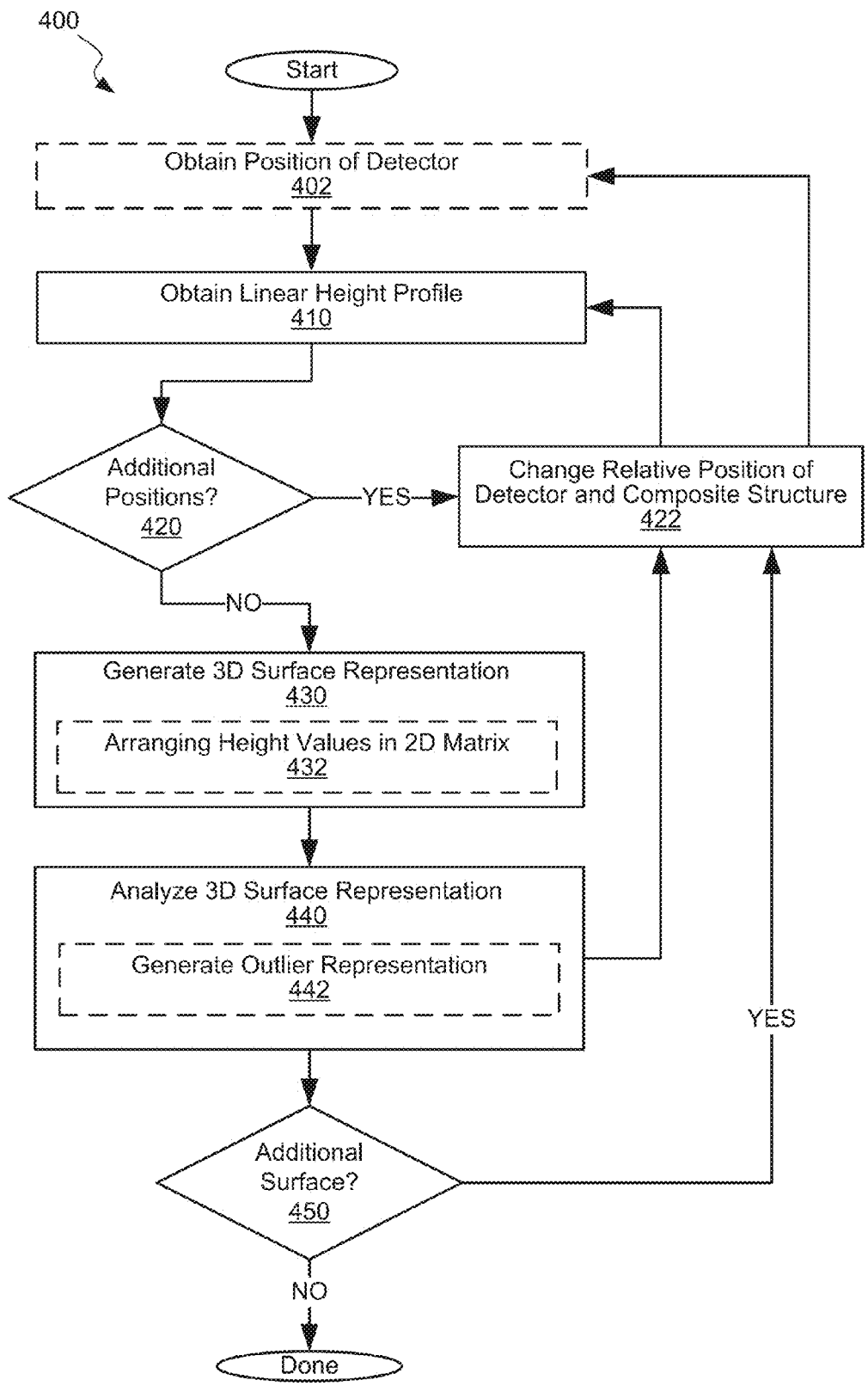
FIG. 4 is a process flowchart corresponding to a method of evaluating height deviations on a surface of a composite structure, in accordance with some embodiments.

Examples of Methods for Evaluating Height Deviations on Surfaces of Composite Structures FIG. 4 is a process flowchart corresponding to method 400 of evaluating height deviations 106 on surface 101 of composite structure 100, in accordance with some embodiments. Method 400 may be performed by inspection system 200, some examples of which are described above with reference to FIGS. 2A and 3A.

In some embodiments, method 400 may involve obtaining current position of detector 202 relative to composite structure 100 during optional operation 402. Operation 402 may be performed prior to operation 410, which involves obtaining linear height profile 220, during operation 410, or after operation 410. In some embodiments, operation 402 is not performed. In these embodiments, the current position of detector 202 may be already known, for example, when detector 202 is moved to a certain new position (e.g., by motion device 209). In this last example, motion device 209 may effectively function as encoder 204. When operation 402 is performed, current position of detector 202 may come from encoder 204 and may be transmitted to system controller 206. As further described below, information the current position of detector 202 (while obtaining a linear height profile) is needed for constructing three-dimensional surface representation 303. The information may be one or more coordinates of detector relative to, for example, some reference point 103 in composite structure 100. The coordinates may include one or more linear coordinates and/or one or more angular coordinates.

Method 400 may involve obtaining multiple linear height profiles of surface 101 of composite structure 100 during multiple operations 410. As shown by decision block 420 in FIG. 4, operation 410 may be repeated one or more times. At least two linear height profiles may be obtained for the same surface 101. Specifically, first linear height profile 220a of surface 101 of composite structure 100 may be obtained during first iteration of operation 410. This iteration may be followed by another iteration of operation 410, which involves obtaining second linear height profile 220b of the same surface 101. Multiple iterations of operations 410 may be performed on the same surface 101 should not be confused when operation 410 is repeated on another surface of the same composite structure 100, e.g., when another layer of plies is applied forming a new surface. This last example corresponds to decision block 450 and further described below.

As schematically shown in FIGS. 2A-2C, first linear height profile 220a extends along field of measurement 205 of detector 202 at first position 210a (identified as $Y_1$) relative to composite structure 100. Similarly, second height profile 220b extends along field of measurement 205 at second position 210b (identified as $Y_2$) relative to composite structure 100. Second position 210b is different from first position 210a. In the examples shown in FIG. 2A, detector 202 is shifted along the Y axis between first position 210a and second position 210b. As further described below, detector may go from first position 210a to second position 210b by shifting along one or more axes and/or turning around an axis.

In some embodiments, second position 210b depends on first linear height profile 220a. For example, if there are substantial height deviations in first linear height profile 220a, then second position 210b may be closer to first position 210a than when first linear height profile 220a has fewer deviations. In other words, second position 210b may be selected based on likelihood of having a wrinkle based on data in first linear height profile 220a, e.g., the higher chance of having a wrinkle, the less offset between second position 210b and first profile 210a.

Method 400 may involve generating three-dimensional surface representation 303 during operation 430. Specifically, three-dimensional surface representation 303 may be generated based multiple linear height profiles (all obtained from same surface 101) and corresponding positions of detector 202 while obtaining each one of these profiles. For example, three-dimensional surface representation 303 may be generated based on first linear height profile 220a, second linear height profile 220b, first position 210a of detector 202, and second position 210b of detector 202.

In some embodiments, generating three-dimensional surface representation 303 may involve arranging 432 height values 303b from first linear height profile 220a and second linear height profile 220b arranged in a two-dimensional matrix 303a as described above with reference to FIGS. 3A and 3B. Each of height values 303b in two-dimensional matrix 303 corresponds to a different position on surface 101 of composite structure 100.

Figure 7A:
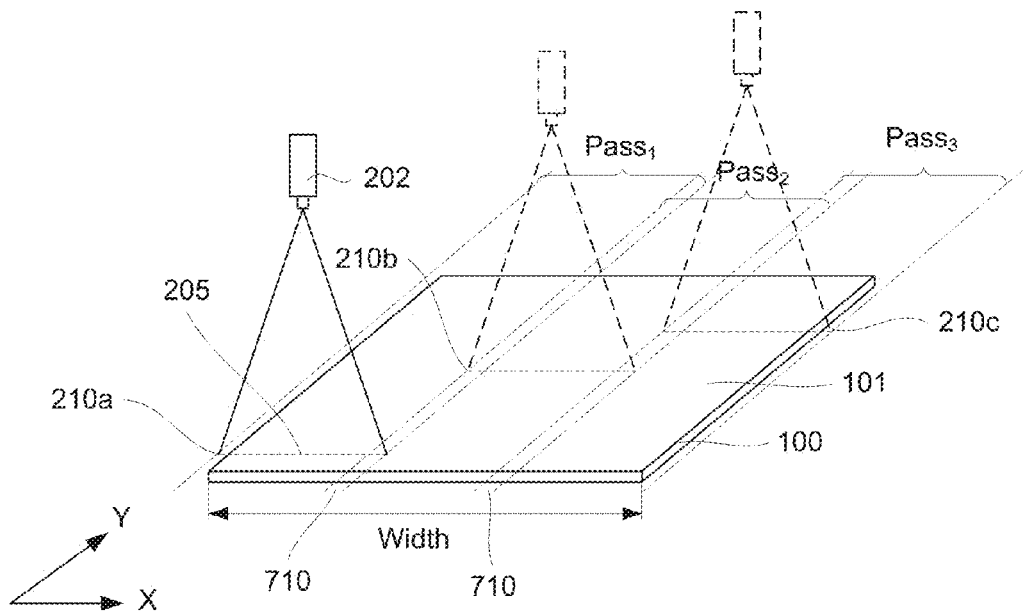
FIG. 7A is a schematic representation of multiple inspection passes showing overlaps between the fields of measurement in different passes, in accordance with some embodiments.

In some embodiments, field of measurement 205 of detector 202 in first position 210a overlaps with field of measurement 205 of detector 202 in second position 210b as, for example, shown in FIG. 7A. In this situation, first linear height profile 220a also overlaps with second linear profile 220b. When generating three-dimensional surface representation 303, each height value 303b in overlap 710 may be an average of height values 303b of first linear height profile 220a and second linear height profile 220b. Alternatively, the greatest of two height values of first linear height profile 220a and second linear height profile 220b may be selected for each identified point in overlap.

Figure 5:
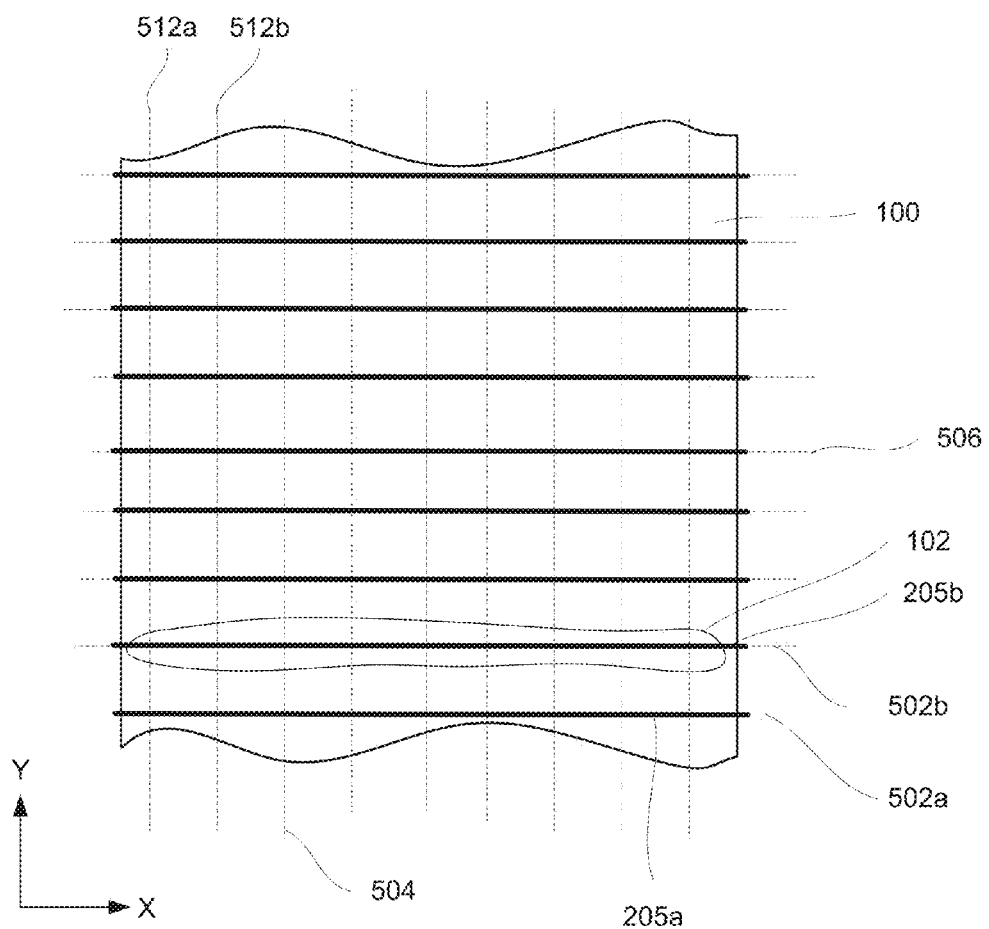
FIG. 5 is a schematic representation of analyzing and inspection directions, in accordance with some embodiments.

Method 400 may involve analyzing three-dimensional surface representation 303 during operation 440. Specifically, three-dimensional surface representation 303 may be analyzed to determine height deviations 106 on surface 101 of composite structure 100. Referring to FIG. 5, analyzing may performed along analyzing direction 504 that is different from first inspection direction 502a. First inspection direction 502a is the direction of field of measurement 205a of detector 202 in first position 210a, e.g., when obtaining first linear height profile 220a. Analyzing direction 504 may be an order, with which the height values in three-dimensional surface representation 303 are analyzed, or a grouping of the height values in three-dimensional surface representation 303 used in analysis. Analyzing direction 504 may be also different than second inspection direction 502b of field of measurement 205b of detector 202 in second position 210b. In some embodiments, analyzing involves identifying some parameters of wrinkles, such as length, depth, maximum angle from the height profile.

Using analyzing directions that are different from inspection directions allows capturing some inconsistencies that otherwise would not be detectable by inspecting linear height profiles individually. FIG. 5 illustrates an example of wrinkle 102 extending along the X axis. If analyzing directions are parallel to linear height profiles, then height values corresponding to the linear height profile extending along wrinkle 102 (also along the X axis) may be uniform. The surrounding linear height profiles that do not extend through wrinkle 102 may also be uniform even though the height values may be uniformly different from the values in the profile extending through wrinkle 102. As such, at least one analyzing direction may need to be different from the inspection direction. As further described below, multiple different analyzing directions may be used.

In some embodiments, analyzing direction 504 may be perpendicular to first inspection direction 502a. As shown in FIG. 5, analyzing direction 504 may be along the Y axis, while first inspection direction 502a may be along the X axis. In this example, analyzing may effectively involve constructing a linear height profile along the Y axis. It should be noted that this profile has never been actually obtained directly from surface 101 but it is constructed using three-dimensional surface representation 303. In general, analyzing direction 504 may at any angle relative to first inspection direction 502a greater than 0° and less or equal to 90°, such as 45°.

In some embodiments, analyzing 440 three-dimensional surface representation 303 is also performed along second analyzing direction 506, which may be parallel to inspection direction 502a. In these embodiments, two analyzing directions may be used that are not parallel to each other, e.g., first analyzing direction 504 and second analyzing direction 506 as shown in FIG. 5.

Figure 6:
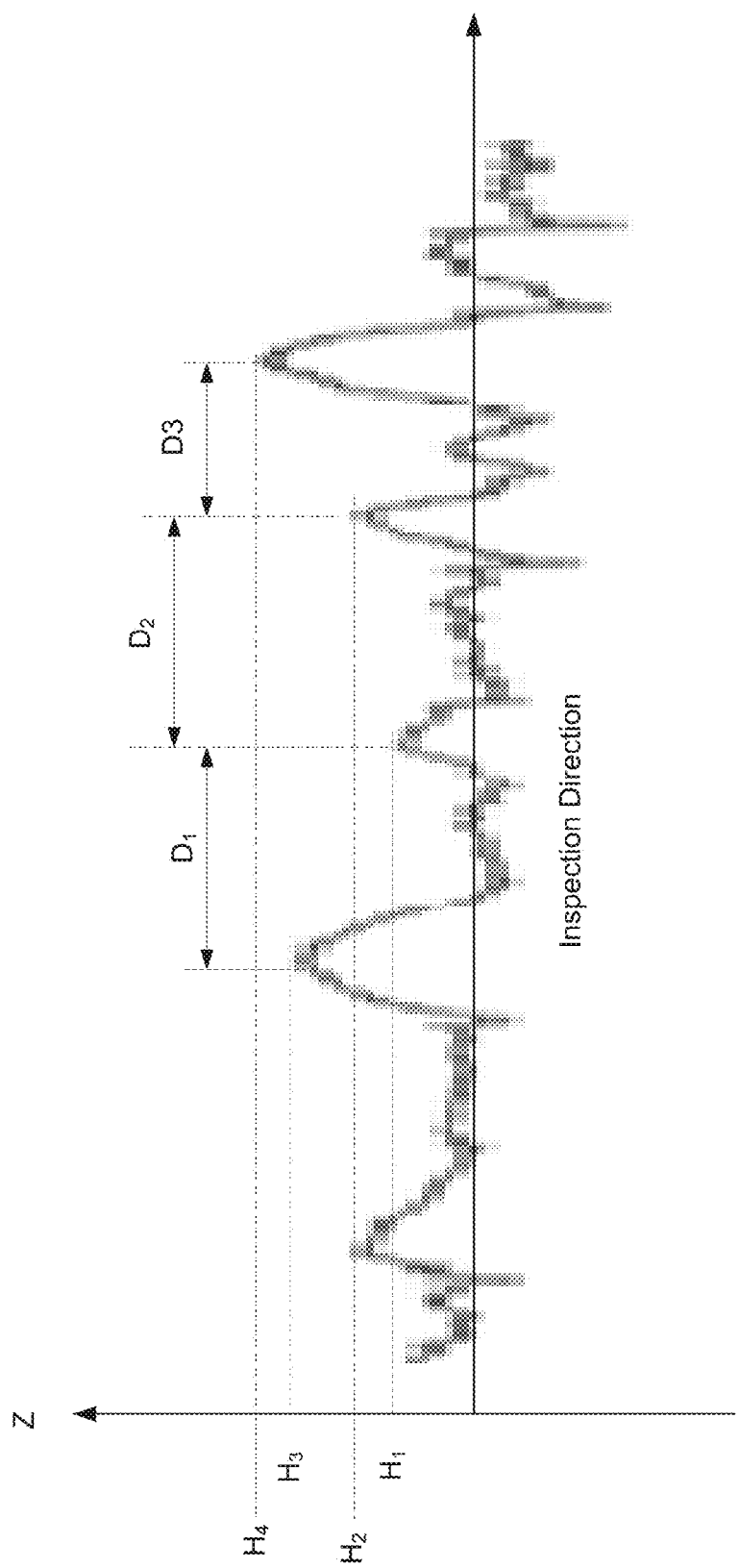
FIG. 6 is a schematic representation of analysis a three-dimensional surface representation along a selected cross-section line, in accordance with some embodiments.

In some embodiments, the height deviation analysis of three-dimensional surface representation 303 involves determining additional characteristics of the surface besides height deviation values. For example, spacing ($D_1$, $D_2$, and $D_3$) between adjacent height deviations may be considered in addition to their heights ($H_1$, $H_2$, $H_3$, and $H_4$) such as shown in FIG. 6. Multiple different characteristics may be used in the same height deviation analysis.

In some embodiments, analyzing three-dimensional surface representation 303 during operation 440 comprises generating 442 outlier representation 310 of all positions on surface 101 that have height deviations 106 outside of tolerance 306 for one or more parameters (e.g., length, depth, maximum angle from the height profile). Specifically, each height value in three-dimensional surface representation 303 may be checked against a range set by tolerance 306 or against the standard. If the value is outside of tolerance, the position corresponding to this value may be flagger in outlier representation 310. For example, failure identification may be assigned to this position. In some embodiments, outlier representation 310 reflects a degree of exceeding tolerance 306. For example, outlier representation 310 may be a grayscale map and the grayscale for each position may be selected based on the level of height value deviation from tolerance 306. Height deviations 106 may represent surface wrinkles, warping, and other potential inconsistencies of composite structure 100.

Figure 8:
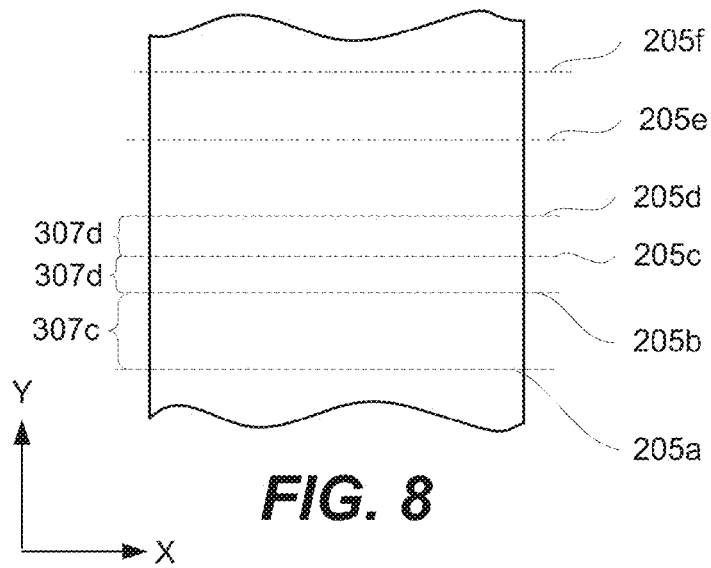
FIGS. 8 and 9 are schematic representations of different orientations fields of measurement, in accordance with some embodiments.
Figure 9:
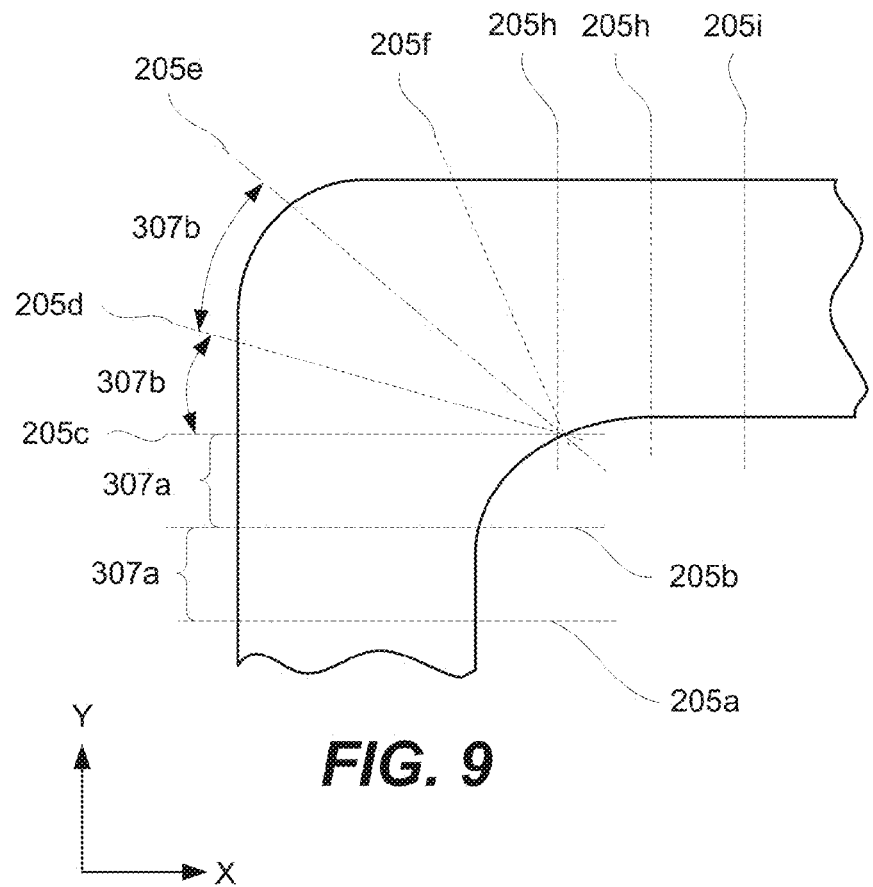

In some embodiments, first field of measurement 205a (e.g., when detector 202 in first position 210a) is parallel to second field of measurement 205b (e.g., when detector 202 in second position 210b) as, for example, shown in FIG. 2A as well as FIGS. 8 and 8. The distance between first field of measurement 205a and second field of measurement 205b may be referred to as offset distance 307a. Alternatively, first field of measurement 205a may not be parallel to second field of measurement 205b (as, for example, shown in FIG. 9), in which case first field of measurement 205a is offset with respect to second field of measurement 205b by offset angle 307b. When three or more linear height profiles are obtained, offset distances 307a may all the same or different (as for, example, shown in FIG. 8). Likewise, offset angles 307b may all the same or different (as for, example, shown in FIG. 9). In some embodiments, offset distance 307a or offset angle 307b may be based on tolerance 306 for height deviations 106.

Returning to FIG. 4, obtaining a linear height profile during operation 410 may be repeated one or more times as indicated by decision block 422. After each operation 410, relative position of detector 202 and composite structure 100 may be changed. This change in position may be performed manually or automatically, e.g., using motion device 209.

Referring to the example above, in which first linear height profile 202a and second linear height profile 202b have already been obtained, method 400 may proceed with obtaining third linear height profile 202c during operation 410c. Third linear height profile 202c extends along field of measurement 205 of detector 202 at third position 210c relative to composite structure 100. Offset 307c between first position 210a and second position 210b may be different from offset 307c between second position 210b and third position 210c as, for example, shown in FIG. 8.

Figure 7B:
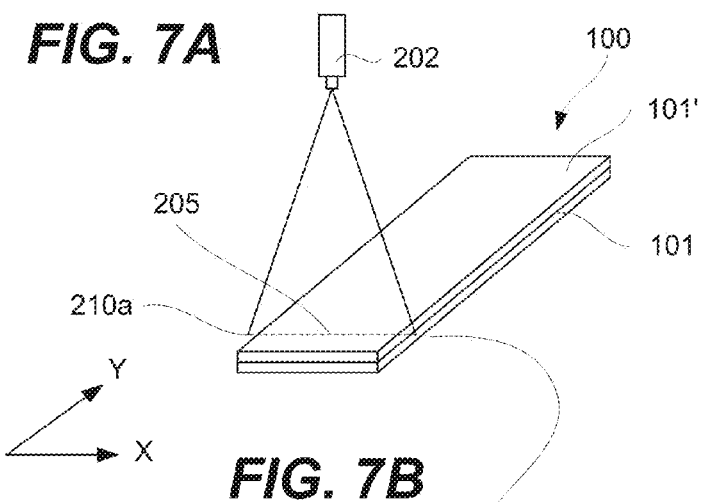
FIG. 7B is a schematic representation of an inspection pass of an additional surface formed over previously inspected surface, in accordance with some embodiments.
Figure 7C:
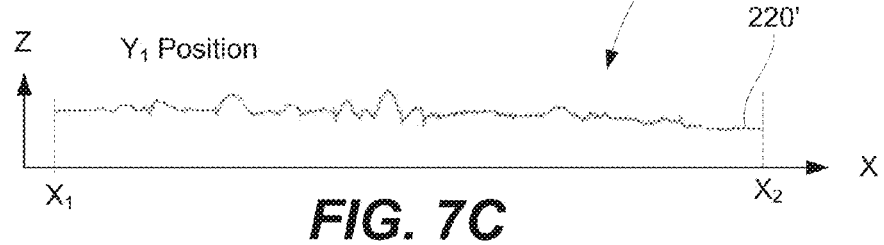
FIG. 7C is a schematic representation of a linear height profile example for the additional surface shown in FIG. 7B.

In some embodiments, method 400 also involves obtaining an additional linear height profile 220d of additional surface 101' of composite structure 101 as, for example, shown by decision block 450 in FIG. 4 and illustrated in FIG. 7B. Additional linear height profile 220' as shown in FIG. 7C extends along field of measurement 205 of detector 202 positioned at first position 210a.

Examples of Controller Computer Inspection Systems

Figure 10:
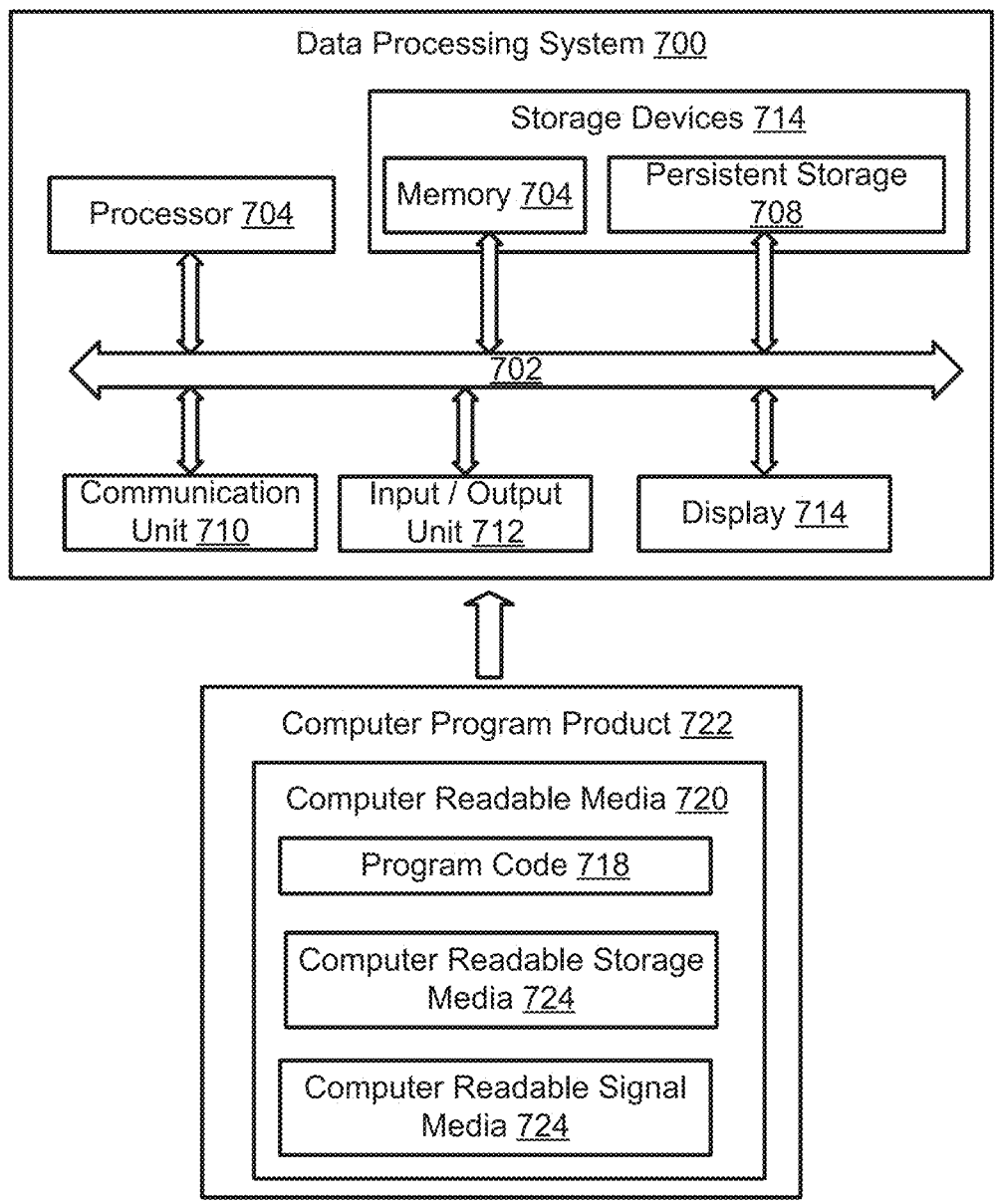
FIG. 10 is an illustration of a data processing inspection system, in accordance with some embodiments.

Turning now to FIG. 10, an illustration of a data processing inspection system 1000 is depicted in accordance with some embodiments. Data processing inspection system 1000 may be used to implement one or more computers used in a system controller of or other components of various inspection systems described above. In some embodiments, data processing inspection system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus inspection system.

Processor unit 1004 serves to execute instructions for software that may be loaded into memory 1006. Processor unit 1004 may be a number of processors, a multi-processor core, or some other type of processor, depending on the particular implementation. Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing inspection systems or devices. In these illustrative examples, communications unit 1010 is a network interface card. Input/output unit 1012 allows for input and output of data with other devices that may be connected to data processing inspection system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating inspection system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing inspection system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing inspection system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing inspection system 1000 are not meant to provide architectural limitations to the manner in which different embodiments may be implemented. The different illustrative embodiments may be implemented in a data processing inspection system including components in addition to and/or in place of those illustrated for data processing inspection system 1000. Other components shown in FIG. 10 can be varied from the illustrative examples shown. The different embodiments may be implemented using any hardware device or inspection system capable of running program code 1018.

Examples of Aircraft and Methods of Fabricating and Operation Aircraft

Figure 11:
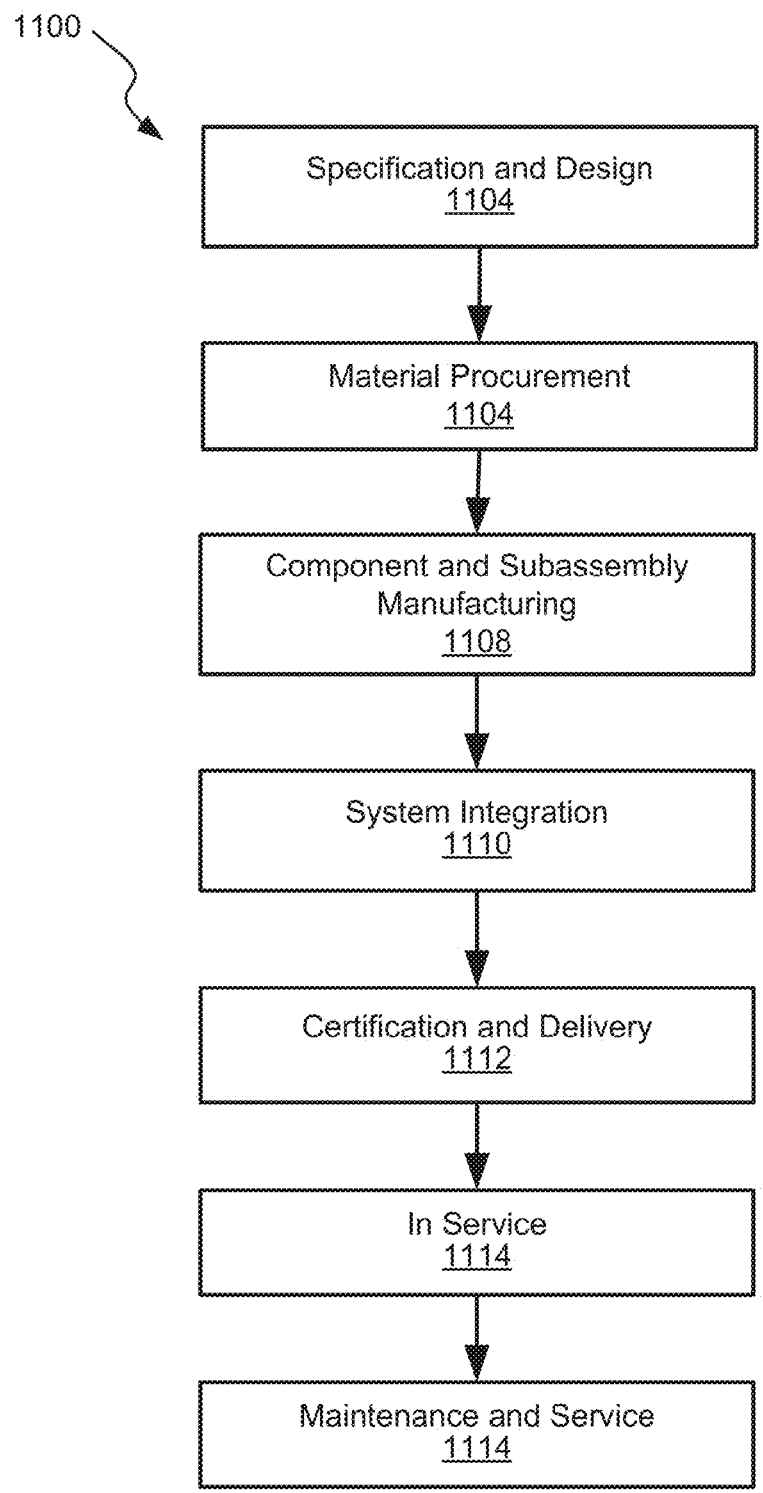
FIG. 11 is a block diagram of aircraft production and service methodology that may utilize methods and systems for evaluating height deviations on surfaces of composite structures described herein.

Examples of the present disclosure may be described in the context of aircraft manufacturing and service method 1100 as shown in FIG. 11 and aircraft 1102 as shown in FIG. 11. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Methods of evaluating height deviations on surfaces of composite structures may be performed during one or more of these stages. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102.

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on. The described methods and systems be used on during specification and design (block 1104) of aircraft 1102 and component and subassembly manufacturing (block 1108). For example, various composite structures used for airframe and interior may be inspected for height deviations during process development and/or actual fabrication.

Figure 12:
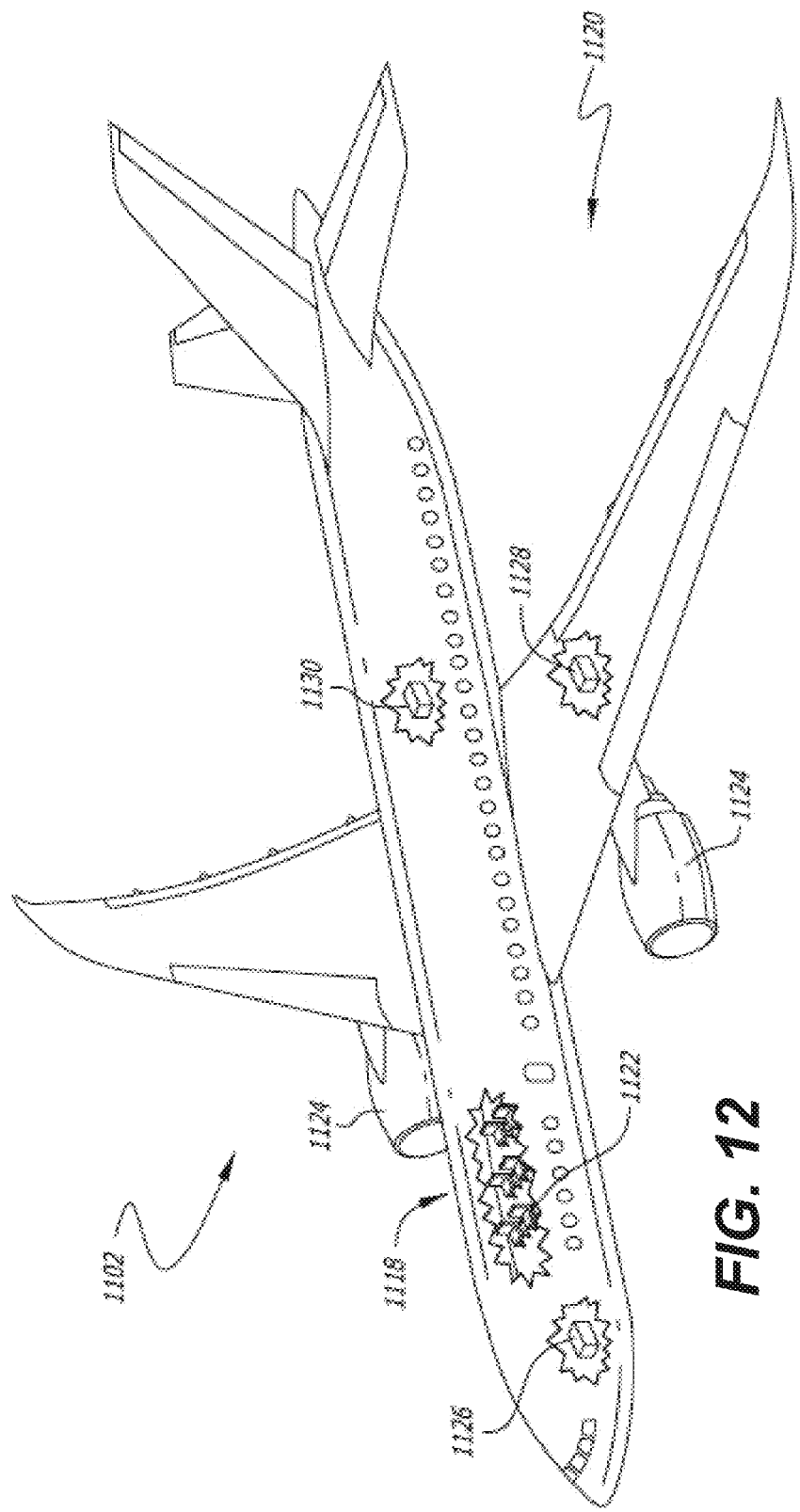
FIG. 12 is a schematic illustration of an aircraft that may include composite structures described herein.

As shown in FIG. 12, aircraft 1102 produced by illustrative method 1100 may include airframe 1118 with a plurality of high-level inspection systems 1120 and interior 1122, which may include the one or more flush mountable bottle openers. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (bock 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of evaluating height deviations on a surface of a composite structure, the method comprising:
obtaining a first linear height profile of the surface of the composite structure,
the first linear height profile extending along a field of measurement of a detector at a first position relative to the composite structure;
obtaining a second linear height profile of the surface of the composite structure, the second height profile extending along the field of measurement of the detector at a second position relative to the composite structure, the second position being different from the first position; and generating a three-dimensional surface representation of the surface of the composite structure based on the first linear height profile, the second linear height profile, the first position of the detector, and the second position of the detector; and analyzing the three-dimensional surface representation to determine the height deviations on the surface of the composite structure, wherein analyzing the three-dimensional surface representation comprises generating an outlier representation of all positions on the surface of the composite structure having the height deviations outside of a tolerance.

2. The method of claim 1, wherein analyzing the three-dimensional surface representation is performed along a first analyzing direction different from a first inspection direction of at least one of the field of measurement of the detector in the first position and different from a second inspection direction of the field of measurement of the detector in the second position.

3. The method of claim 2, wherein the first analyzing direction is perpendicular to the first inspection direction.

4. The method of claim 2, wherein analyzing the three-dimensional surface representation is further performed along a direction parallel to the direction of the field of measurement of the detector in the first position relative to the composite structure.

5. The method of claim 1, wherein the height deviations comprise one of surface wrinkles or warping.

6. The method of claim 1, further comprising obtaining the first position of the detector relative to the composite structure and obtaining the second position of the detector relative to the composite structure.

7. The method of claim 6, wherein the first position and the second position are obtained from an encoder.

8. The method of claim 1, wherein the field of measurement of the detector in the first position is parallel to the field of measurement of the detector in the second position.

9. The method of claim 1, wherein the field of measurement of the detector in the first position is offset from the field of measurement of the detector in the second position by at least one of an offset distance or an offset angle.

10. The method of claim 9, wherein the at least one of the offset distance or the offset angle is based on tolerance for one or more parameters for the height deviations.

11. The method of claim 1, further comprising obtaining a third linear height profile of the surface of the composite structure, the third linear height profile extending along the field of measurement of the detector at a third position relative to the composite structure, wherein an offset between the first position and the second position is different from an offset between the second position and the third position.

12. The method of claim 1, wherein generating the three-dimensional surface representation comprises presenting height values from the first linear height profile and the second linear height profile arranged in a two-dimensional matrix, wherein each of the height values in the two-dimensional matrix corresponds to a different position on the surface of the composite structure.

13. The method of claim 12, wherein the first linear height profile overlaps with the second linear profile at an overlap on the surface of the composite structure, and wherein each height value in the overlap is an average of the height values of the first linear height profile and the second linear height profile.

14. The method of claim 1, further comprising changing a position of the detector relative to the composite structure from the first position to the second position.

15. The method of claim 14, wherein changing the position is performed manually.

16. The method of claim 1, wherein the second position depends on the first linear height profile.

17. The method of claim 1, further comprising obtaining an additional linear height profile of an additional surface of the composite structure, the additional linear height profile extending along the field of measurement of the detector positioned at the first position.

18. The method of claim 1, wherein the detector is a laser profiler.

19. An inspection system for of evaluating height deviations on a surface of a composite structure, the inspection system comprising:

a detector configured to obtain a first linear height profile and a second linear height profile of the surface of the composite structure;

an encoder configured to determine a first position of the detector while obtaining the first linear profile and a second position of the detector while obtaining the second linear profile; and a system controller configured to generate a three-dimensional surface representation of the surface of the composite structure based on the first linear height profile, the second linear height profile, the first position of the detector, and the second position of the detector, the system controller being further configured to analyze the three-dimensional surface representation to determine the height deviations on the surface of the composite structure, wherein analyzing the three-dimensional surface representation comprises generating an outlier representation of all positions on the surface of the composite structure having the height deviations outside of a tolerance.

20. The inspection system of claim 19, wherein the system controller comprises a computer program for generating the three-dimensional surface representation of the surface of the composite structure based on the first linear height profile, the second linear height profile, the first position of the detector, and the second position of the detector and for analyzing the three-dimensional surface representation to determine the height deviations on the surface of the composite structure.

21. The method of claim 1, wherein the first linear height profile comprises a first plurality of height values corresponding to different surface positions along the field of measurement of the detector at the first position relative to the composite structure, and wherein the second linear height profile comprises a second plurality of height values corresponding to different surface positions along the field of measurement of the detector at the second position relative to the composite structure.

* * * * *